US010272382B2

(12) United States Patent
She et al.

(10) Patent No.: US 10,272,382 B2
(45) Date of Patent: Apr. 30, 2019

(54) CARRIER GAS RECLAMATION SYSTEM AND METHOD

(71) Applicant: United Technologies Corporation, Farmington, CT (US)

(72) Inventors: Ying She, East Hartford, CT (US); Aaron T. Nardi, East Granby, CT (US); Lawrence Binek, Glastonbury, CT (US); Andrzej Ernest Kuczek, Bristol, CT (US); Zissis A. Dardas, Worcester, MA (US)

(73) Assignee: United Technologies Corporation, Farmington, CT (US)

( * ) Notice: Subject to any disclaimer, the term of this patent is extended or adjusted under 35 U.S.C. 154(b) by 333 days.

(21) Appl. No.: 15/169,124

(22) Filed: May 31, 2016

(65) Prior Publication Data

US 2017/0341018 A1    Nov. 30, 2017

(51) Int. Cl.
| | |
|---|---|
| *B01D 53/22* | (2006.01) |
| *B01D 53/30* | (2006.01) |
| *B01D 53/053* | (2006.01) |
| *B01D 53/047* | (2006.01) |
| *B33Y 40/00* | (2015.01) |

(Continued)

(52) U.S. Cl.
CPC .......... *B01D 53/30* (2013.01); *B01D 53/047* (2013.01); *B01D 53/053* (2013.01); *B01D 53/22* (2013.01); *B01D 53/229* (2013.01); *B29C 64/357* (2017.08); *B33Y 40/00* (2014.12); *B01D 2053/221* (2013.01); *B01D 2256/10* (2013.01); *B01D 2257/104* (2013.01); *B01D 2257/80* (2013.01); *C23C 24/04* (2013.01)

(58) Field of Classification Search
CPC .. B01D 46/0027; B01D 53/229; B01D 53/30; B01D 2053/221; B01D 53/047; B01D 53/053; B01D 46/0036; B01D 2267/40; B33Y 40/00; B33Y 10/00; C23C 24/04
See application file for complete search history.

(56) References Cited

U.S. PATENT DOCUMENTS

| | | | |
|---|---|---|---|
| 3,266,225 A * | 8/1966 | Barr | ................... B01D 46/0068 55/293 |
| 4,810,288 A * | 3/1989 | Baszczuk | .................. B22F 9/08 264/13 |

(Continued)

*Primary Examiner* — Anthony R Shumate
(74) *Attorney, Agent, or Firm* — Kinney & Lange, P.A.

(57) ABSTRACT

A carrier gas recovery system for use in cold spray manufacturing recovers carrier gas utilized during the cold spray process and recycles the carrier gas for immediate use or stores the carrier gas for future use. The carrier gas recovery system includes an enclosure subsystem, a filtration subsystem, a reclamation subsystem, and a compensation subsystem. An article is placed in the enclosure and particulate matter is carried to the article on a carrier gas stream. Carrier gas in the enclosure is filtered through the filtration subsystem to remove particulate from the carrier gas, and the filtered carrier gas is fed to the reclamation subsystem. The carrier gas either flows to a gas separator, to increase the concentration of carrier gas, or to the compensation subsystem if the carrier gas concentration is sufficiently high. The carrier gas can be stored in the compensation subsystem or used in further cold spray manufacturing.

20 Claims, 2 Drawing Sheets

(51) Int. Cl.
*B29C 64/357* (2017.01)
*C23C 24/04* (2006.01)

(56) References Cited

U.S. PATENT DOCUMENTS

| | | | | |
|---|---|---|---|---|
| 4,909,814 A * | 3/1990 | Sisk | ........................ | B01D 46/00 55/304 |
| 5,121,599 A * | 6/1992 | Snyder | .................... | F01D 25/20 184/6.11 |
| 5,368,067 A * | 11/1994 | Cook, Jr. | .................. | F17B 1/26 137/485 |
| 5,368,633 A * | 11/1994 | Foldyna | .................... | G21F 9/02 376/314 |
| 5,468,282 A * | 11/1995 | Yugami | .............. | B01D 46/0063 55/338 |
| 5,501,198 A * | 3/1996 | Koyama | ............ | F02M 25/0809 123/198 D |
| 5,858,034 A * | 1/1999 | Shida | ................. | B01D 46/0089 123/519 |
| 5,916,245 A * | 6/1999 | Tom | ........................ | B01D 53/04 206/0.7 |
| 9,731,240 B2 * | 8/2017 | Koyama | ............ | B01D 46/0069 |
| 2002/0157359 A1 * | 10/2002 | Stenersen | ........... | B01D 46/0023 55/350.1 |
| 2004/0035091 A1 * | 2/2004 | Wang | .................... | B01D 46/002 55/283 |
| 2005/0247197 A1 * | 11/2005 | Snow, Jr. | ................. | A62C 3/06 95/138 |
| 2006/0144700 A1 * | 7/2006 | Carson | .................... | A61L 2/035 204/252 |
| 2007/0151454 A1 * | 7/2007 | Marwitz | ............... | B01D 53/229 96/7 |
| 2009/0308060 A1 * | 12/2009 | Suzuki | ............... | B01D 46/0058 60/311 |
| 2012/0137890 A1 * | 6/2012 | Koyama | ............ | B01D 46/0041 96/233 |
| 2016/0184772 A1 * | 6/2016 | White | ................ | B05D 53/0476 95/41 |
| 2017/0145963 A1 * | 5/2017 | Dudar | ................ | F02M 25/0836 |

* cited by examiner

CARRIER GAS RECLAMATION SYSTEM AND METHOD

STATEMENT OF GOVERNMENT INTEREST

This invention was made with government support under Contract No. W911NF-14-2-0011 awarded by the United States Army. The government has certain rights in the invention.

BACKGROUND

The present application relates generally to additive manufacturing, and more particularly, to a system and process for the recovery and reuse of a carrier gas used during additive manufacturing.

Additive manufacturing is a process whereby layers of material are added to an article to either form or repair the article. Additive manufacturing allows complex design features to be incorporated into parts where those complex design features had proved infeasible using conventional manufacturing techniques. Additive manufacturing may involve thermally bonding material together or mechanically bonding material together. Cold spray manufacturing involves mechanically bonding a particle to an article. During cold spray manufacturing a stream of carrier gas is accelerated to supersonic velocities and a particulate is added to the carrier gas stream. Helium is the preferred carrier gas for cold spray manufacturing because higher-quality parts can be manufactured with a helium gas stream than with other gases. The carrier gas stream is impinged upon the article, thereby causing the particulate matter to bond to the article due to the kinetic energy of the particulate matter. The carrier gas is generally vented to the atmosphere after impinging against the article. As such, a large volume of helium is typically utilized during a cold spray process, thereby contributing a large portion of the costs associated with cold spray manufacturing, as helium is a non-renewable resource.

SUMMARY

According to an embodiment of the present disclosure, a carrier gas reclamation system includes an enclosure configured to house an article, a dust collector subsystem disposed downstream of the enclosure and configured to receive a carrier gas from the enclosure and produce a filtered gas, a reclamation subsystem disposed downstream of the dust collector subsystem and configured to receive the filtered gas from the dust collector subsystem and produce a purified gas, and a compensation subsystem configured to receive the purified gas. The reclamation subsystem includes a first control valve, a second control valve, and a gas separator configured to receive the filtered gas from the first control valve and increase a concentration of the filtered gas to provide the purified gas. The compensation subsystem is configured to receive the purified gas through the second control valve.

According to another embodiment, a carrier gas reclamation process includes purging an enclosure with a purge gas, flowing a carrier gas stream from a first source through the enclosure and past an article, whereby a particulate carried by the carrier gas stream is deposited on the article, flowing the carrier gas from the enclosure and to a reclamation subsystem, flowing purified carrier gas from the reclamation subsystem and back to the enclosure to increase a carrier gas concentration in the enclosure, and flowing the purified carrier gas from the enclosure to a carrier gas storage tank when the carrier gas concentration within the enclosure reaches a predetermined level.

DETAILED DESCRIPTION

Figure 1:
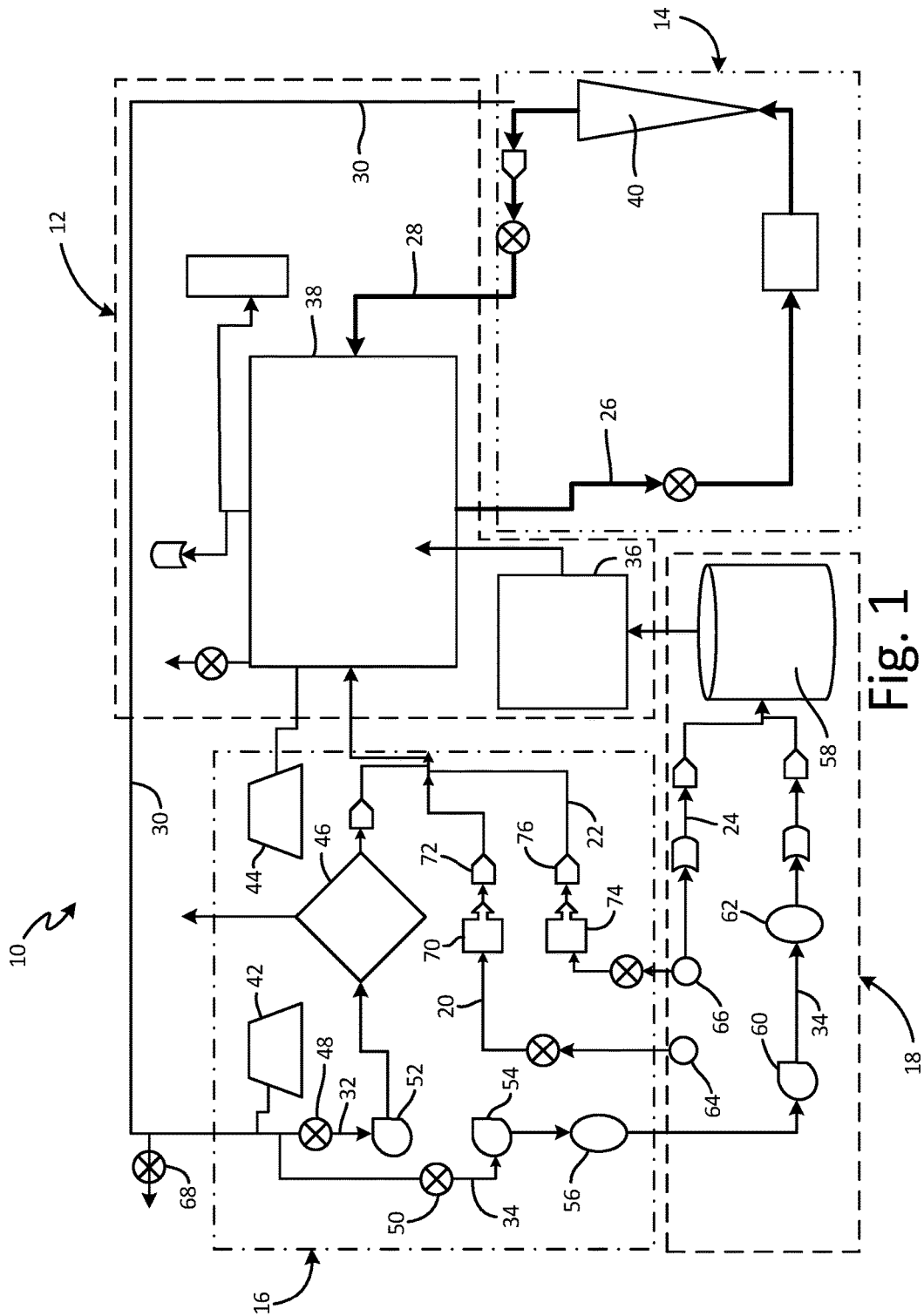
FIG. 1 is a schematic diagram of a carrier gas reclamation system.

FIG. 1 is a schematic diagram of carrier gas reclamation system 10. Carrier gas reclamation system 10 includes enclosure subsystem 12, filtration subsystem 14, reclamation subsystem 16, compensation subsystem 18, purge line 20, facility gas line 22, load line 24, recovery line 26, first filtered gas line 28, second filtered gas line 30, purification line 32, and reclamation line 34. Enclosure subsystem 12 includes injection control 36 and enclosure 38. Filtration subsystem 14 includes filter 40. Reclamation subsystem 16 includes first gas analyzer 42, second gas analyzer 44, gas separator 46, first control valve 48, second control valve 50, first compressor 52, second compressor 54, and first buffer tank 56. Compensation subsystem 18 includes storage tank 58, third compressor 60, second buffer tank 62, facility purge gas supply 64, and facility carrier gas supply 66. Second filtered gas line 30 includes vent valve 68. Purge line 20 includes purge flow controller 70 and purge check valve 72. Facility gas line 22 includes facility flow controller 74 and facility check valve 76.

Enclosure 38 is configured to receive and house an article during an additive manufacturing process. Injection control 36 regulates the flow of carrier gas to enclosure 38 from compensation subsystem 18. Enclosure 38 is airtight to prevent gas from flowing between the atmosphere and enclosure 38. Second gas analyzer 44 is connected to enclosure 38 and is configured to sense a carrier gas concentration in enclosure 38. Enclosure 38 is connected to filtration subsystem 14 through recovery line 26. Recovery line 26 exits enclosure 38 and connects to filter 40. First filtered gas line 28 splits from second filtered gas line 30 downstream of filter 40. First filtered gas line 28 connects filter 40 back to enclosure 38. Second filtered gas line 30 connects filtration subsystem 14 and reclamation subsystem 16. Vent valve 68 is connected to second filtered gas line 30 upstream of reclamation subsystem 16. Second filtered gas line 30 flows into reclamation subsystem 16 and splits into purification line 32 to connect to first control valve 48 and into reclamation line 34 to connect to second control valve 50. First gas analyzer 42 is connected to second filtered gas line 30 upstream of first control valve 48 and second control valve 50. Second gas analyzer 44 is connected to enclosure 38 and configured to sense a carrier gas concentration in enclosure 38. First compressor 52 is disposed downstream of first control valve 48. Gas separator 46 is disposed downstream of first compressor 52, and gas separator 46 is further connected to enclosure 38 such that carrier gas may flow from gas separator 46 and back to enclosure 38. Purification line 32 connects second filtered gas line 30 to gas separator 46 and to enclosure 38. Second compressor 54 is disposed downstream of second control valve 50 and connected to both second control valve 50 and first buffer tank 56.

Compensation subsystem 18 is disposed downstream of first buffer tank 56 and is configured to receive carrier gas from first buffer tank 56. First buffer tank 56 is connected to third compressor 60, and third compressor 60 is further connected to second buffer tank 62. Second buffer tank 62 is connected to storage tank 58. Reclamation line 34 proceeds from second control valve 50 and to storage tank 58, and reclamation line 34 connects second control valve 50, second compressor 54, first buffer tank 56, third compressor 60, second buffer tank 62, and storage tank 58. Storage tank 58 is connected to injection control 36 and is configured to provide carrier gas to injection control 36 and thus to enclosure 38. Facility purge gas supply 64 is connected to enclosure 38 by purge line 20. Purge flow controller 70 controls the flow rate of purge gas through purge line 20 from facility purge gas supply 64. Purge check valve 72 is disposed downstream of purge flow controller 78 to prevent purge gas from flowing back to facility purge gas supply 64. Facility carrier gas supply 66 is connected to enclosure 38 by facility gas line 22, and facility carrier gas supply 66 is connected to storage tank 58 by load line 24. Facility flow controller 74 is disposed downstream of facility carrier gas supply 66 and is configured to control the flow of carrier gas to enclosure 38 through facility gas line 22. Facility check valve 76 is disposed on facility gas line 22 downstream of facility flow controller 82 to prevent carrier gas from flowing to facility carrier gas supply 66 through facility gas line 22.

Enclosure subsystem 12 is configured to house an article during a cold spray manufacturing process. During the cold spray manufacturing process a particulate is accelerated on a carrier gas stream, such as a helium stream, and the particulate impinges against the article. The kinetic energy imparted on the particulates causes the particulates to fuse with the article, and as such cold spray manufacturing is mechanical process. Before activating the cold spray process the article is placed in enclosure 38 and enclosure 38 is sealed in an airtight manner. Enclosure 38 is purged with a purge gas to eliminate oxygen and water moisture from enclosure 38. The purge gas, which is preferably an inexpensive, semi-inert gas such as nitrogen, is supplied to enclosure 38 by facility purge gas supply 64. The purge gas is provided to enclosure through purge line 20. Purge flow controller 78 meters the flow of purge gas to enclosure 38 from facility purge gas supply 64. The purge gas is flowed through enclosure 38 until the concentration of oxygen and water moisture in enclosure 38 is sufficiently low. Second gas analyzer 44 senses a composition of the gas within enclosure 38 to determine when the concentration of oxygen and water moisture is sufficiently low.

After enclosure 38 is purged with the purge gas, the cold spray process is activated and the carrier gas stream is flowed through enclosure 38. The particulate is added to the carrier gas stream as the carrier gas stream is accelerated into enclosure 38. The carrier gas stream impinges on the article to cause the particulate to bond to the article. The injection of the carrier gas stream, and thus the particulate, is controlled by injection control 36. Initially, the carrier gas is supplied by facility carrier gas supply 66 through load line 24 and storage tank 58. The concentration of the carrier gas within enclosure 38 increases as the cold spray process proceeds, due to additional carrier gas being supplied to enclosure 38 throughout the cold spray manufacturing process. Alternatively, before beginning the cold spray process, enclosure 38 may be purged a second time with carrier gas from facility carrier gas supply 66. The second purge with carrier gas increases the carrier gas concentration within enclosure 38, thereby reducing the time needed to increase the carrier gas concentration to a level where carrier gas reclamation system 10 may operate in a self-sustaining mode, discussed in further detail below. As such, the second purge also increases the efficiency of carrier gas reclamation system 10. Where either a single purge or multiple purges are conducted, further carrier gas is introduced to enclosure 38 by the cold spray process.

A gas mixture, which comprises a mixture of the carrier gas and the purge gas, flows from enclosure 38 to filtration subsystem 14 through recovery line 26. The gas mixture then flows to filter 40 through recovery line 26. Filter 40 removes the particulate that was not deposited on the article from the gas mixture. A filtered gas flows downstream from filter 40 through one of first filtered gas line 28 and second filtered gas line 30. A first portion of filtered gas flows from filter 40 and back to enclosure 38 through first filtered gas line 28. The first portion of filtered gas is flowed back to enclosure 38 to ensure that particulate within enclosure 38 flows to filtration subsystem 14 to remove the free particulate. A second portion of filtered gas flows from filter 40 and downstream through second filtered gas line 30. When operating carrier gas system 10 in a first mode, where the carrier gas is not reclaimed, vent valve 68 may be opened to vent the second portion of filtered gas to the atmosphere.

With carrier gas reclamation system 10 operating in a second mode, where the carrier gas is reclaimed and recycled, vent valve 68 is closed and the second portion of filtered gas flows to first control valve 48 and second control valve 50 through second filtered gas line 30. Second filtered gas line 30 splits into purification line 32 and reclamation line 34 upstream of first control valve 48 and second control valve 50. First gas analyzer 42 senses a carrier gas concentration within second filtered gas line 30 upstream of where second filtered gas line 30 splits into purification line 32 and reclamation line 34. Where first gas analyzer 42 senses that the carrier gas concentration is less than that required to operate the cold spray process, preferably about 99% of the gas mixture, carrier gas reclamation system 10 operates in a first reclamation mode, whereby the carrier gas within carrier gas reclamation system 10 is purified to increase the concentration of carrier gas within carrier gas reclamation system 10. In the first reclamation mode, first control valve 48 is opened and second control valve 50 is closed. As such, second control valve 50 prevents the gas mixture from flowing to compensation subsystem 18 when the carrier gas concentration is below the level required to operate the cold spray process. The gas mixture instead flows through first control valve 48, downstream through purification line 32, and to gas separator 46. While first control valve 48 and second control valve 50 are configured to open or close based on a carrier gas concentration of about 99%, first control valve 48 and second control valve 50 may controlled based on any carrier gas concentration suitable for use in the cold spray manufacturing process. Moreover, while first gas analyzer 42 is described as sensing the carrier gas concentration to control the position of first control valve 48 and second control valve 50, second gas analyzer 44 may sense the concentration of the carrier gas within enclosure 38 to control the position of first control valve 48 and second control valve 50, or both first gas analyzer 42 and second gas analyzer 44 may sense the concentration of the carrier gas at different points in carrier gas reclamation system 10 to control first control valve 48 and second control valve 50. Furthermore, both first control valve 48 and second control valve 50 may be any suitable valve for controlling the flow of gas. For example, first control valve 48 and second control valve 50 may each be a ball valve, butterfly valve, pivot valve, poppet valve, or any other suitable valve for controlling the flow of gas.

Where the carrier gas concentration below that required by the cold spray process, the second portion of filtered gas flows through first control valve 48 and is compressed by first compressor 52. The second portion of filtered gas then proceeds downstream of first compressor 52 and to gas separator 46. In gas separator 46 the carrier gas is separated from the second portion of filtered gas to produce a purified carrier gas. The purge gas that is separated from the gas mixture may be vented to the atmosphere. Gas separator 46 may include a membrane-based purifier, a pressure swing adsorption purifier, or any other suitable purification system for separating the carrier gas. Where a pressure swing adsorption purification system is utilized, a pressure swing adsorption process, a vacuum swing adsorption process, a vacuum pressure swing adsorption process, or any other suitable adsorption process may be utilized. The purified carrier gas flows downstream from gas separator 46 and is fed into enclosure 38. Flowing the purified carrier gas back into enclosure 38 increases the carrier gas concentration within enclosure 38. First control valve 48 remains open until the carrier gas concentration reaches a predetermined, sufficient concentration, preferably equal to or above 99% for helium reclamation. As such, the second portion of filtered gas continues to flow to gas separator 46 thereby increasing the carrier gas concentration within enclosure 38.

When the carrier gas, purified gas, and filtered gas concentration is equal to or above 99%, a purified gas is flowing through system 10. With the filtered gas concentration equal to or above 99% first control valve 48 is closed and second control valve 50 is opened. With first control valve 48 closed and second control valve 50 opened, carrier gas reclamation system 10 is in a second reclamation mode. Closing first control valve 48 prevents the second portion of filtered gas from flowing to gas separator 46 and back to enclosure 38. Opening second control valve 50 allows the second portion of filtered gas to flow downstream to compensation subsystem 18 through reclamation line 34. The second portion of filtered gas flows to second compressor 54, which is preferably a low pressure compressor capable of compressing the purified gas to a pressure of about 0.69-0.83 MPa (100-200 psi) and is compressed, the compressed second portion of filtered gas flows to first buffer tank 56. From first buffer tank 56 the second portion of filtered gas flows to third compressor 60, which is preferably a high pressure compressor capable of compressing the purified gas to a pressure of about 9.65-10.35 MPa (1400-1500 psi), and the second portion of filtered gas then flows downstream from third compressor 60 to second buffer tank 62. From second buffer tank 62, the second portion of filtered gas flows to storage tank 58. In this way the gas supplied to storage tank 58 has a carrier gas concentration equal to or above 99%.

With carrier gas reclamation system 10 operating in the second reclamation mode, the carrier gas for the cold spray process is provided exclusively from storage tank 58, without any additional carrier gas supplied by facility carrier gas supply 66. In the second reclamation mode, carrier gas is initially provided to enclosure 38 from storage tank 58, with the initial carrier gas stream carrying the particulate for deposition on the article. The carrier gas then flows through filtration subsystem 14, and thus through filter 40, to remove excess particulate from the carrier gas. The carrier gas flows downstream through second filtered gas line 30 and to reclamation line 34 through second control valve 50. The carrier gas is compressed and flowed back to storage tank 58 through reclamation line 34. The carrier gas is stored within storage tank 58 until needed by the cold spray manufacturing process. The carrier gas is again utilized by the cold spray manufacturing process to carry particulate matter. As such, the carrier gas introduced to enclosure 38 during the cold spray manufacturing process is recycled for further use in the cold spray manufacturing process. In this way, the cold spray manufacturing process is self-sustainable as no additional carrier gas is needed beyond that already cycling within carrier gas reclamation system 10.

Carrier gas reclamation system 10 provides significant advantages. The carrier gas utilized in cold spray manufacturing is preferably helium, which is a non-renewable resource and which comprises a significant portion of the cost associated with the cold spray manufacturing process. Recycling and reusing the carrier gas provides significant cost savings as the need for additional carrier gas is eliminated. Carrier gas reclamation system 10 may be used in multiple cells within a single production facility to allow carrier gas to be recovered and recycled from multiple enclosures. In addition, carrier gas reclamation system 10 provides efficient and cost-effective carrier gas recovery by cycling of the carrier gas to increase the concentration of the carrier gas within carrier gas reclamation system 10 and by utilizing the highly-concentrated carrier gas to operate the cold spray manufacturing process in a self-sustainable manner. Carrier gas reclamation system 10 further allows the user to control the purity of the carrier gas used in the carrier gas stream. For example, the gas flowing through carrier gas reclamation system 10 may continue to be cycled to increase the purity of the gas until a desired concentration of carrier gas has been achieved. The desired concentration of carrier gas may differ between applications, and as such, carrier gas reclamation system 10 may be configured to operate in the second mode once the carrier gas stream has reached any desired purity level.

Figure 2:
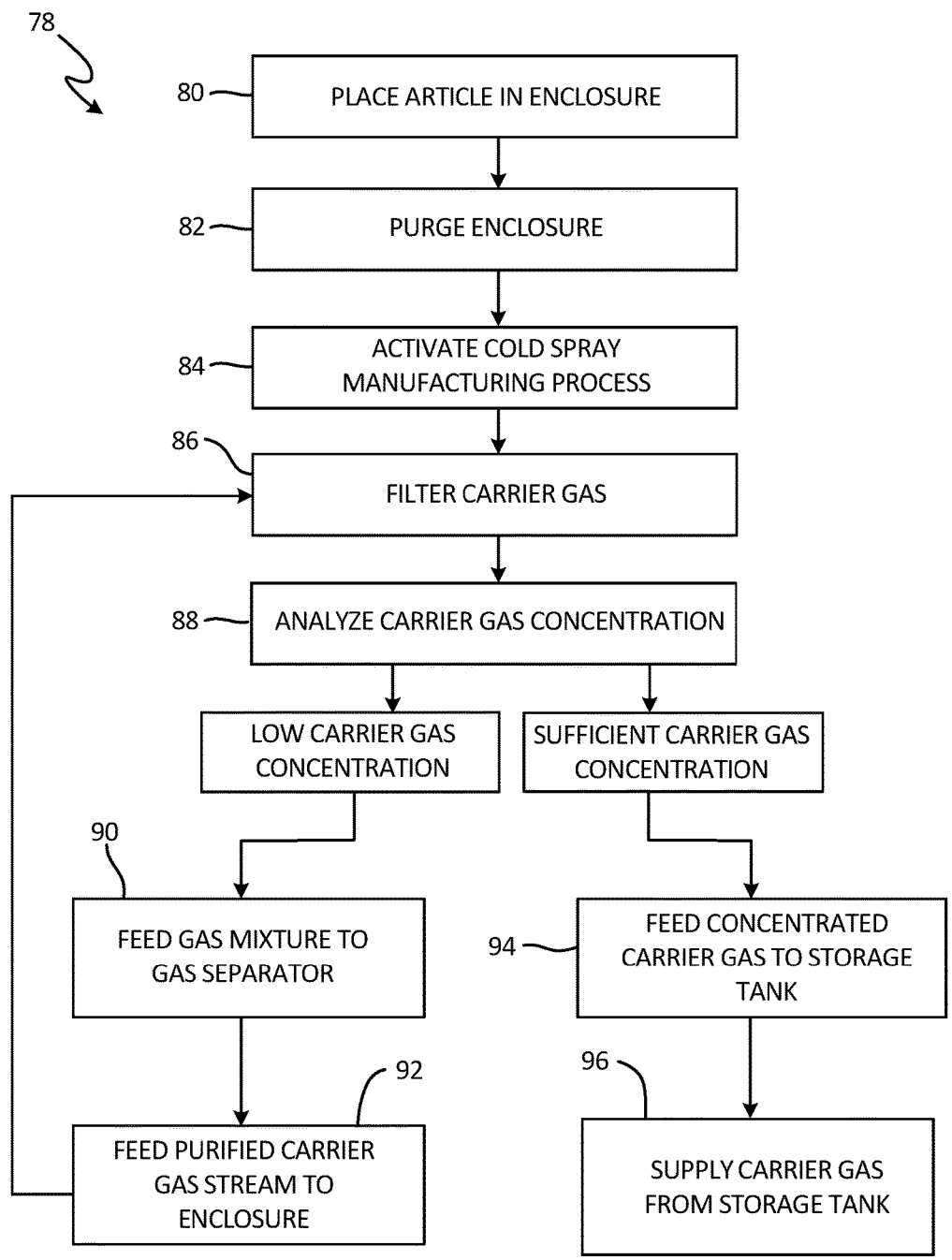
FIG. 2 is a flow diagram of a carrier gas reclamation process.

FIG. 2 is a flow diagram of carrier gas reclamation process 78. Carrier gas reclamation process 78 includes a plurality of steps (80-96) for running a cold spray manufacturing process in a self-sustainable manner. In step 80 an article to be modified or repaired utilizing the cold spray manufacturing process is placed in an enclosure, such as enclosure 38, and the enclosure is sealed to prevent gas from flowing between the enclosure and the atmosphere. In step 82 the enclosure is purged with a purge gas, such as nitrogen, to remove oxygen and moisture from the enclosure. The purge gas is flowed through the enclosure until the concentration of oxygen and the concentration of moisture within the enclosure is at a sufficiently low level for the cold spray manufacturing process to operate efficiently.

In step 84, the cold spray manufacturing process is activated and supplied with a carrier gas stream from a facility carrier gas supply, such as facility carrier gas supply 66. The carrier gas stream is accelerated into the enclosure and towards the article. The carrier gas stream carries a particulate for deposition on a surface of the article. The carrier gas is accelerated at such a rate that the kinetic energy of the particulate causes the particulate to mechanically fuse to the article. The carrier gas mixes with the purge gas in the enclosure to form a gas mixture.

In step 86, the gas mixture within the enclosure is filtered through a filtration subsystem, such as filtration subsystem 14, to remove any particulate not deposited on the article from the gas mixture. The filtration subsystem produces a filtered gas mixture. A first portion of the filtered gas mixture is flowed back to the enclosure and a second portion of the filtered gas mixture is flowed downstream.

In step 88, the second portion of the filtered gas mixture is analyzed to determine a carrier gas concentration in the second portion of the filtered gas, such as by first gas analyzer 42. The carrier gas concentration may also be analyzed within enclosure to determine the carrier gas concentration within the gas mixture. In step 88 carrier gas reclamation process 78 asks whether the carrier gas concentration is equal to or above a concentration required to operate the cold spray process, preferably the carrier gas comprises 99% or more of the gas mixture. Where the carrier gas concentration is below about the concentration required to operate the cold spray process, then carrier gas reclamation process 78 proceeds to steps 90 and 92. Where the carrier gas concentration is equal to or above the concentration required to operate the cold spray process, then carrier gas reclamation process 78 proceeds to steps 94 and 96.

In step 90 the gas mixture is fed to a gas separator, such as gas separator 46. The gas separator purifies the gas mixture to remove the purge gas and produce a purified stream of carrier gas. In step 92 the purified stream of carrier gas is fed back to the enclosure to thereby increase the concentration of carrier gas within the gas mixture in enclosure. After the purified stream of carrier gas is fed back to the enclosure, carrier gas reclamation process 78 proceeds back to step 86 as the gas mixture within enclosure is fed to the filtration system.

The carrier gas continues to cycle through steps 86-92 and back to step 86, increasing the concentration of the carrier gas within the gas mixture, until the concentration of carrier gas is equal to or above the concentration required to operate the cold spray process. When the carrier gas concentration is sensed as being equal to or above the concentration required to operate the cold spray process at step 88, the carrier gas reclamation process 78 proceeds to step 94. In step 94 the second portion of filtered gas, which comprises highly concentrated carrier gas, is fed to a carrier gas storage tank, such as storage tank 58. In step 96 the cold spray process is operated in a self-sustaining manner. As such, at step 96 the cold spray process is supplied with carrier gas from the carrier gas storage tank, the carrier gas proceeds through the enclosure and the filtration subsystem, and the carrier gas is fed back to the carrier gas storage tank, and the carrier gas is reused by the cold spray process to carry further particulate into the enclosure. At step 96 the cold spray manufacturing process is thus self-sustaining and the cold spray process requires no additional carrier gas from an external source.

Carrier gas reclamation process 78 provides significant advantages. The carrier gas is cycled throughout the cold spray process, instead of being vented to the atmosphere, thereby preventing waste of carrier gas and decreasing the need for additional carrier gas during the cold spray process. The carrier gas is preferably helium, which is a non-renewable resource and which contributes a significant portion of the cost of the cold spray process. Carrier gas reclamation process 78 cycles the carrier gas to increase the concentration of carrier gas within the system. Once the carrier gas concentration reaches a concentration required to operate the cold spray process, the recycled carrier gas is utilized by the cold spray process to apply particulate to the article. As such, carrier gas reclamation process 78 purifies the carrier gas to a point that the cold spray process operates in a self-sustainable manner where no further carrier gas is supplied to the system from outside sources.

Discussion of Possible Embodiments

The following are non-exclusive descriptions of possible embodiments of the present invention.

A carrier gas reclamation system includes an enclosure configured to house an article, a dust collector subsystem disposed downstream of the enclosure and configured to receive a carrier gas from the enclosure and produce a filtered gas, a reclamation subsystem disposed downstream of the dust collector subsystem and configured to receive the filtered gas from the dust collector subsystem, and a compensation subsystem configured to receive a purified gas through a second control valve. The reclamation subsystem includes a first control valve, the second control valve, and a gas separator configured to receive the filtered gas from the first control valve and increase a concentration of the filtered gas to provide the purified gas.

The carrier gas reclamation system of the preceding paragraph can optionally include, additionally and/or alternatively, any one or more of the following features, configurations and/or additional components:

The gas separator is configured to provide the purified gas to the enclosure.

A gas analyzer disposed upstream of the first control valve and the second control valve.

The first control valve is configured to remain open when the filtered gas is below 99% carrier gas and to close when the filtered gas is 99% carrier gas and above, and wherein the second control valve is configured to remain closed when the filtered gas is below 99% carrier gas and to open when the filtered gas is 99% carrier gas and above.

A first compressor disposed between the first control valve and the gas separator, and a second compressor disposed downstream of the second control valve.

A storage tank configured to provide gas to the enclosure, and a high pressure compressor disposed between the second control valve and the storage tank.

A gas analyzer attached to the enclosure and configured to sense a gas composition within the enclosure.

The gas separator comprises a membrane-based purifier.

The gas separator comprises a pressure swing adsorption purifier.

The gas separator is connected to the enclosure and configured to provide the concentrated gas to the enclosure.

A carrier gas reclamation process includes purging an enclosure with a purge gas, flowing a carrier gas stream from a first source through the enclosure and past an article, whereby a particulate carried by the carrier gas stream is deposited on the article, flowing the carrier gas from the enclosure and to a reclamation subsystem, flowing purified carrier gas from the reclamation subsystem and back to the enclosure to increase a carrier gas concentration in the enclosure, and flowing the purified carrier gas from the enclosure to a carrier gas storage tank when the carrier gas concentration within the enclosure reaches a predetermined level.

The carrier gas reclamation process of the preceding paragraph can optionally include, additionally and/or alternatively, any one or more of the following features, configurations and/or additional components:

Flowing the purge gas through the enclosure, wherein the purge gas comprises nitrogen, and sensing a concentration of oxygen and water moisture in the enclosure.

Flowing the carrier gas through a dust collector subsystem to remove the particulate from the carrier gas and produce a filtered carrier gas, and determining a carrier gas concentration in the filtered carrier gas upstream of the reclamation subsystem.

Flowing the carrier gas through a filtration subsystem to produce the filtered carrier gas, flowing a first portion of the filtered carrier gas to the enclosure, and flowing a second portion of the filtered carrier gas to the reclamation subsystem.

Sensing the carrier gas concentration with a gas analyzer, commanding a first control valve based on the carrier gas concentration, commanding a second control valve based on the carrier gas concentration.

Opening the first control valve when the carrier gas concentration is below 99%, and flowing the carrier gas through the first control valve and to a carrier gas purifier.

Opening the second control valve when the carrier gas concentration is 99% and above, and flowing the carrier gas through the second control valve.

Sensing the carrier gas concentration in the enclosure, bypassing the reclamation subsystem with the purified carrier gas provided from the enclosure when the carrier gas concentration is equal to or above the predetermined concentration, and storing the purified carrier gas in the purified carrier gas storage tank.

The carrier gas concentration is equal to or above the predetermined concentration when the carrier gas concentration is 99% and above.

Ceasing the flow of carrier gas from the first source when the carrier gas concentration is at the predetermined level, and supplying the carrier gas for the carrier gas stream from the carrier gas storage tank.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A carrier gas reclamation system comprising:
   an enclosure that houses an article during an additive manufacturing process;
   a filter disposed downstream of the enclosure and fluidly connected to the enclosure to receive a gas mixture comprised of carrier gas and purge gas from the enclosure;
   a filtered gas line extending downstream from the filter;
   a purification line extending from the filtered gas line to the enclosure;
   a reclamation line extending from the filtered gas line;
   a first control valve disposed on the purification line between the filtered gas line and the enclosure;
   a second control valve disposed on the reclamation line;
   a gas separator connected to the purification line at a location downstream of the first control valve and upstream of the enclosure; and
   a gas storage tank connected to the reclamation line at a location downstream of the second control valve, wherein the gas storage tank is disposed upstream of the enclosure and is fluidly connected to the enclosure.

2. The carrier gas reclamation system of claim 1, wherein the gas separator is configured to provide the purified gas to the enclosure.

3. The carrier gas reclamation system of claim 1, and further comprising:
   a gas analyzer operatively connected to the filtered gas line upstream of the first control valve and the second control valve.

4. The carrier gas reclamation system of claim 3, wherein the first control valve is configured to remain open when the filtered gas is below 99% carrier gas and to close when the filtered gas is 99% carrier gas and above, and wherein the second control valve is configured to remain closed when the filtered gas is below 99% carrier gas and to open when the filtered gas is 99% carrier gas and above.

5. The carrier gas reclamation system of claim 1, further comprising:
   a first compressor disposed on the purification line between the first control valve and the gas separator; and
   a second compressor disposed on the reclamation line downstream of the second control valve and upstream of the gas storage tank.

6. The carrier gas reclamation system of claim 5, further comprising:
   a third compressor disposed on the reclamation line between the second compressor and the storage tank.

7. The carrier gas reclamation system of claim 1, and further comprising:
   a gas analyzer attached to the enclosure and configured to sense a gas composition within the enclosure.

8. The carrier gas reclamation system of claim 1, wherein the gas separator comprises a membrane-based purifier.

9. The carrier gas reclamation system of claim 1, wherein the gas separator comprises a pressure swing adsorption purifier.

10. A carrier gas reclamation process comprising:
    purging an enclosure with a purge gas;
    flowing a carrier gas stream from a first source through the enclosure and past an article, whereby a particulate carried by the carrier gas stream is deposited on the article;
    flowing the carrier gas from the enclosure through a filtration subsystem and to a reclamation subsystem through a filtered gas line extending from the filtration subsystem to the reclamation subsystem;
    flowing the carrier gas from the filtration line to a purification line through a first valve, flowing the carrier gas from the first valve to a gas separator to increase a purity of the carrier gas, and flowing the carrier gas from the gas separator to the enclosure to increase a carrier gas concentration in the enclosure; and
    flowing the carrier gas from the filtration subsystem to a reclamation line through a second valve, and flowing the carrier gas from the second valve to a carrier gas storage tank when the carrier gas concentration within the enclosure reaches the predetermined level.

11. The carrier gas reclamation process of claim 10, wherein the step of purging an enclosure with a gas further comprises:
    flowing the purge gas through the enclosure, wherein the purge gas comprises nitrogen; and
    sensing a concentration of oxygen and water moisture in the enclosure.

12. The carrier gas reclamation process of claim 10, wherein the step of flowing the carrier gas from the enclosure through the filtration subsystem and to the reclamation subsystem through the filtered gas line extending from the filtration subsystem to the reclamation subsystem further comprises:
    removing the particulate from the carrier gas to produce a filtered carrier gas; and determining a carrier gas concentration in the filtered carrier gas at a location upstream of the reclamation subsystem.

13. The carrier gas reclamation process of claim 12, wherein the step of removing the particulate from the carrier gas to produce the filtered carrier gas further comprises:
flowing a first portion of the filtered carrier gas to the enclosure; and
flowing a second portion of the filtered carrier gas to the reclamation subsystem.

14. The carrier gas reclamation process of claim 12, wherein the step of determining a carrier gas concentration in the filtered carrier gas at a location upstream of the reclamation subsystem further comprises:
sensing the carrier gas concentration with a gas analyzer;
commanding the first control valve based on the carrier gas concentration; and
commanding the second control valve based on the carrier gas concentration.

15. The carrier gas reclamation process of claim 14, and further comprising:
opening the first control valve when the carrier gas concentration is below 99%; and
flowing the carrier gas through the first control valve and to a carrier gas purifier.

16. The carrier gas reclamation process of claim 14, and further comprising:
opening the second control valve when the carrier gas concentration is 99% and above; and
flowing the carrier gas through the second control valve.

17. The carrier gas reclamation process of claim 10, wherein the step of flowing the carrier gas from the filtration subsystem to the reclamation line through the second valve, to the carrier gas storage tank when the carrier gas concentration within the enclosure reaches the predetermined level further comprises:
sensing the carrier gas concentration in the enclosure;
bypassing the reclamation subsystem with a purified carrier gas provided from the enclosure when the carrier gas concentration is equal to or above a predetermined concentration; and
storing the purified carrier gas in the carrier gas storage tank.

18. The carrier gas reclamation process of claim 17, wherein the carrier gas concentration is equal to or above the predetermined concentration when the carrier gas concentration is 99% and above.

19. The carrier gas reclamation process of claim 10, and further comprising:
ceasing the flow of carrier gas from the first source when the carrier gas concentration is at the predetermined level; and
supplying the carrier gas for the carrier gas stream from the carrier gas storage tank.

20. The carrier gas reclamation system of claim 1, wherein:
the first control valve is opened and the second control valve is closed with the carrier gas reclamation system in a first reclamation mode, such that the gas mixture can flow to the gas separator and is prevented from flowing to the gas storage tank with the carrier gas reclamation system in the first reclamation mode; and
the first control valve is closed and the second control valve is opened with the carrier gas reclamation system in a second reclamation mode, such that the gas mixture can flow to the gas storage tank and is prevented from flowing to the gas separator with the carrier gas reclamation system in the second reclamation mode.

* * * * *